United States Patent

Dickerson et al.

[11] Patent Number: 5,915,747
[45] Date of Patent: *Jun. 29, 1999

[54] METHOD OF MAKING A ROTOR WITH VENTED HAT SECTION AND AN INITIAL CASTING

[75] Inventors: Weston E. Dickerson, Milford; Charles E. Burger, Farmington, both of Mich.

[73] Assignee: Hayes Lemmerz International, Inc., Romulus, Mich.

[*] Notice: This patent is subject to a terminal disclaimer.

[21] Appl. No.: 09/055,421

[22] Filed: Apr. 4, 1998

Related U.S. Application Data

[60] Provisional application No. 60/060,538, Sep. 30, 1997.
[51] Int. Cl.⁶ .......................... B23P 13/04; B22D 11/128
[52] U.S. Cl. .................. 29/527.6; 29/557; 188/18 A; 188/218 XL; 428/64.1; 428/579
[58] Field of Search .................. 29/527.6, 557; 188/18 A, 218 XL; 428/64.1, 579

[56] References Cited

U.S. PATENT DOCUMENTS

| | | | |
|---|---|---|---|
| 2,323,972 | 7/1943 | Brauchler | 29/527.6 |
| 3,553,808 | 1/1971 | Koziara | 29/527.6 |
| 3,692,090 | 9/1972 | Brobeck et al. | 29/527.6 |
| 3,809,192 | 5/1974 | Stehle | 188/218 XL |
| 4,067,098 | 1/1978 | Blair, Jr. | 29/527.6 |
| 4,575,361 | 3/1986 | Thatcher | 29/527.6 |
| 4,757,883 | 7/1988 | Theil et al. | |
| 4,825,981 | 5/1989 | Otto et al. | |
| 5,123,157 | 6/1992 | Cerny | 29/527.6 |
| 5,473,808 | 12/1995 | Winters, Sr. | 29/527.6 |
| 5,480,007 | 1/1996 | Hartford | 188/18 A |
| 5,501,306 | 3/1996 | Martino | 188/218 XL |

FOREIGN PATENT DOCUMENTS

| | | | |
|---|---|---|---|
| 521754A1 | 1/1993 | European Pat. Off. | 188/218 XL |
| 58-94646 | 6/1983 | Japan | 188/218 XL |
| 60-30836 | 2/1985 | Japan | 188/218 XL |

Primary Examiner—P. W. Echols
Attorney, Agent, or Firm—Marshall & Melhorn

[57] ABSTRACT

The invention is directed to a rotor having a vented hat section and a method of forming the same. Such a rotor includes a hat section having a central mounting face and a cylindrical shoulder or hat wall extending axially from the mounting face to an annular peripheral section having friction surfaces disposed on opposite sides. A plurality of spaced apart vents are defined in the wall of the hat section. The vented rotor is formed by first casting a rotor to the desired configuration including at least the hat section. The initial casting is formed in such a manner that one or more depressions are provided in the radially inner surface of the wall of the hat section. These depressions do not extend through the wall of the hat section. Then, material is removed in one or more machining steps from the radially outer surface of the wall of the hat section proximate the depressions. Such material is removed to the point that the depressions extend completely through the wall of the hat section to form the vents. Alternatively, the initial casting is formed in such a manner that one or more vents are provided in the hat section wall which extend completely through the hat wall.

11 Claims, 2 Drawing Sheets

METHOD OF MAKING A ROTOR WITH VENTED HAT SECTION AND AN INITIAL CASTING

RELATED APPLICATION

This application is claiming the benefit, under 35 USC §119(e), of the provisional application filed Sep. 30, 1997 under 35 USC § 111(b), which was granted a serial number of 60/060,538. The provisional application, Ser. No. 60/060,538, is hereby incorporated by reference in its entirety.

BACKGROUND OF THE INVENTION

The present invention relates to rotors for caliper disc brakes and the like, and in particular to an improved rotor with a cross vented hat section and method of making same.

Rotors are generally well known in the art, and are used extensively in vehicle braking systems, power transmission devices, clutches, and other similar machinery and mechanisms. Vehicle caliper disc braking systems slow the vehicle by inhibiting the rotation of the vehicle wheels. Rotors used in typical braking systems include a central hat section for attaching the rotor to a vehicle wheel and drive member for rotation therewith, and an annular peripheral section having friction surfaces disposed on opposite sides.

A caliper assembly secured to a non-rotating component of the vehicle, such as the vehicle frame. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving rotor friction surfaces, frictional forces are created which oppose the rotation of the wheels and slow the vehicle. The friction converts the vehicle's kinetic energy into large quantities of heat, much of which is absorbed by the friction surfaces and conducted to the rest of the rotor and to other components to which the rotor is connected.

Excess heat leads to premature brake wear and/or failure. Therefore a brake rotor should quickly transfer and dissipate the heat generated during braking. Vents have been formed in the friction surface of the rotor to circulate air around the friction surface for cooling the brake. However, the circulated air does not effectively reach other portions of the rotor such as the hat section and these portions continue to retain the unwanted heat. The hat section also blocks the circulated cooling air from the other vehicle components such as the spindle or axle which are heated during braking. It is desirable to cool the hat section of the rotor and the vehicle components to which the rotor is mounted.

Brake rotors are typically cast from a ferrous material such as cast grey iron, and then are machined in multiple operations to shape the hat section and friction surfaces. In general, solid cast iron or cast aluminum rotors are preferred from the standpoint of strength. Rotors having vented friction surfaces, however, are typically produced by initially casting a solid rotor which is then subjected to relatively extensive machining operations to form the vents. While this has proven to be an effective means of producing vented rotors, the additional machining operations increase the cost of manufacturing such rotors. It would therefore be advantageous to provide a method of forming a rotor having a vented hat section which is less expensive than the conventional method of forming vents, and which may not be significantly more expensive than the conventional method of forming a full cast, solid rotor.

SUMMARY OF THE INVENTION

The invention is directed to a rotor having a vented hat section and a method of forming the same. Such a rotor includes a hat section having a central mounting face for mounting the rotor on an associated drive member such as a spindle or vehicle axle. The hat section also includes a cylindrical shoulder or hat wall extending from the periphery of the mounting face. A plurality of spaced apart vents are defined in the wall of the hat section.

The vented rotor is formed by first casting a rotor to the desired configuration including at least the hat section. The initial casting is formed in such a manner that one or more depressions are provided in the radially inner surface of the wall of the hat section. These depressions do not extend through the wall of the hat section. Then, material is removed in one or more machining steps from the radially outer surface of the wall of the hat section proximate the depressions. Such material is removed to the point that the depressions extend completely through the wall of the hat section to form the vents. Alternatively, the initial casting is formed in such a manner that one or more vents are provided in the hat section wall which extend completely through the hat wall.

BRIEF DESCRIPTION OF THE DRAWINGS

The advantages of the invention will become readily apparent to those skilled in the art from the following detailed description of a preferred embodiment when considered in the light of the accompanying drawings, in which.

DESCRIPTION OF THE PREFERRED EMBODIMENTS

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
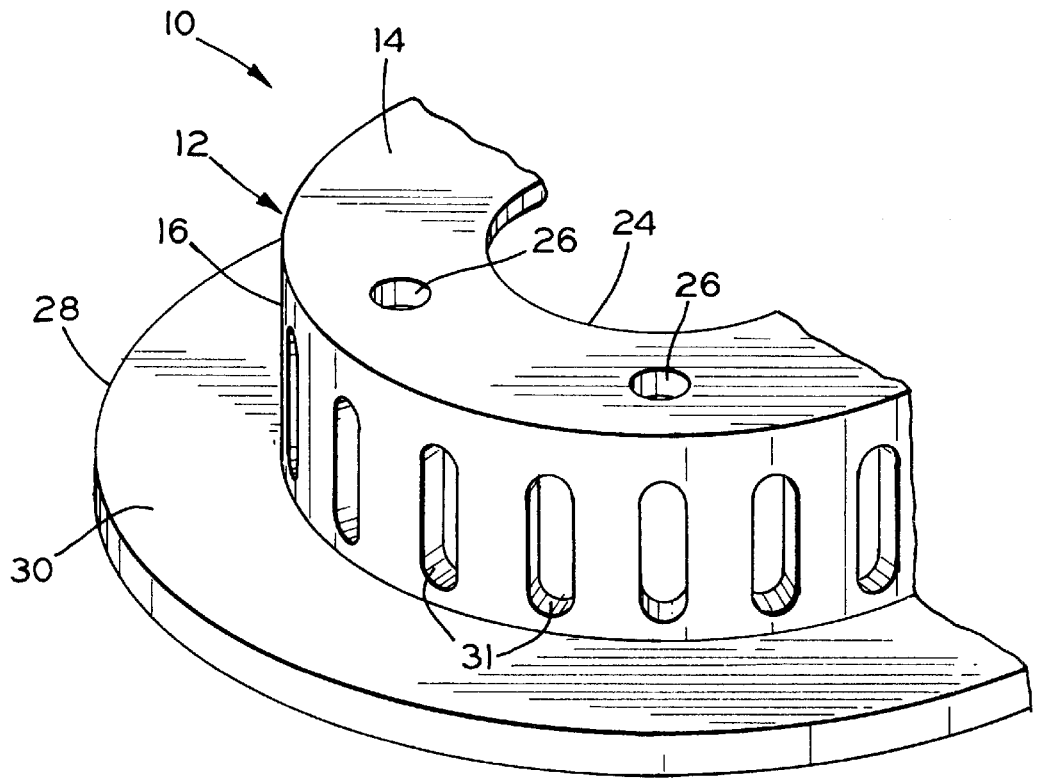
FIG. 1 is a perspective view of a portion of a vented rotor formed in accordance with the invention.
Figure 2:
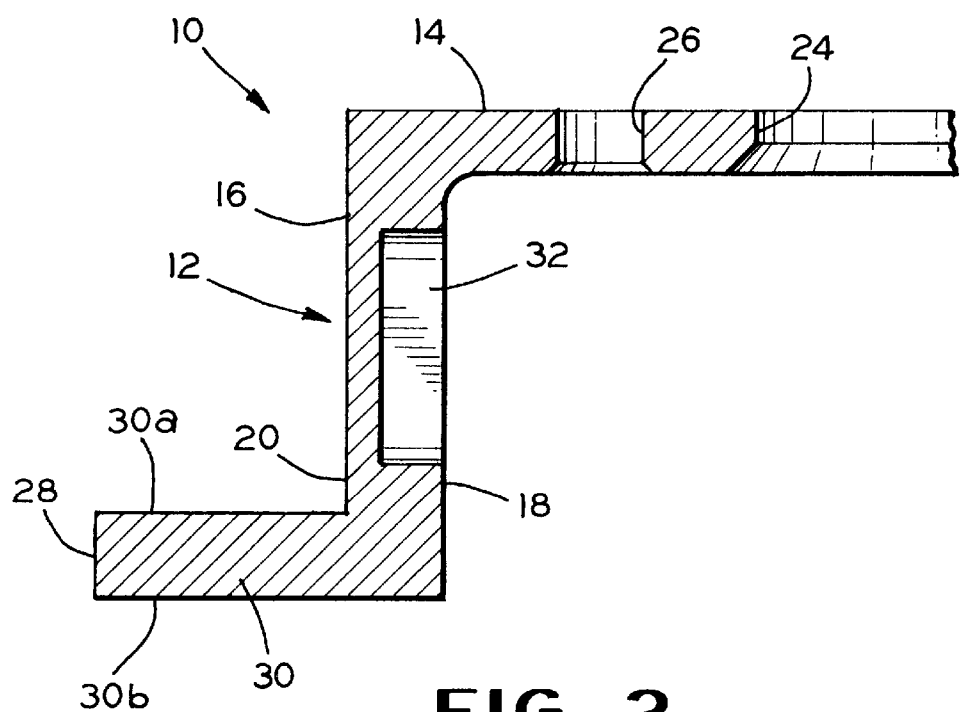
FIG. 2 is a sectional view of a rotor after the casting step of the method of the invention.

Referring now to the drawings, there is illustrated in FIGS. 1 and 2 a vented rotor formed in accordance with the invention, denoted generally by the reference numeral 10. The rotor 10 is of the type adapted for use in conjunction with a variety of mechanical devices, such as caliper disc brakes and the like. The rotor 10 includes a central hub or hat section 12 having a mounting face 14 for mounting the rotor 10 on an associated drive member (not shown), such as a spindle or vehicle axle. The hat section 12 also includes a cylindrical shoulder or hat wall 16 extending axially from the periphery of the mounting face 14. The hat wall 16 includes a radially inner surface 18 and a radially outer surface 20.

The central mounting face 14 of the hat section 12 of rotor 10 is provided with a central pilot aperture 24 in which a spindle hub or the like (not shown) may be closely received. A plurality of circumferentially spaced apart fastener apertures 26 in which fasteners (also not shown) may be received to mount the rotor 10 on an associated drive mechanism in the conventional manner.

The rotor 10 also includes a ring-shaped friction section 28 extending radially outwardly from the wall 16 of the hat section 10. Flat annular friction surfaces 30 are located on opposite sides of the friction section 28, including an axially upper friction surface 30a (as shown in FIG. 2) and an axially lower friction surface 30b. The friction surfaces 30a, 30b are adapted to interface with associated friction members (not shown), such as brake pads or the like. Although the friction surfaces 30a, 30b are shown without vents, vents (not shown) may optionally be formed therein. The optional vents may extend through the friction section 28 in the axial direction, the radial direction, or both.

In the final rotor 10, a plurality of spaced apart vents 31 are disposed in the hat section wall 16, (as shown in FIG. 1 and discussed further below) to provide enhanced overall air flow about the hat section 12. The vents preferably extend through the hat section wall 16 in the radial direction. The vents preferably have an oblong shape extending axially along the hat section wall 16 between the axially upper friction surface 30a, however, they may be round, rectangular or have any other suitable shape.

In accordance with a preferred embodiment of the invention, the rotor 10 having a vented hat section 12 is formed by the following method. First, the rotor 10 is cast using any conventional casting method from a suitable material, such as grey iron, aluminum or the like, to the desired configuration including at least the hat section 12. As shown in FIG. 2, the initial casting is formed in such a manner that one or more circumferentially spaced apart depressions 32 are provided in the radially inner surface 18 of the hat wall 16.

Each of the depressions 32 is formed at a location at which a vent 31 is desired in the final rotor 10, and is preferably formed of the shape desired for the vents 31 in the final rotor 10. The depressions 32 are formed of a depth, taken generally perpendicularly to the radially inner surface 18, which is at least equal to the desired thickness of the hat wall 16 in the final rotor 10. However, in the initial casting, the depressions 32 are formed so as not to radially extend completely through the hat wall 16, as shown in FIG. 2. In this respect, FIG. 2 has not been drawn to scale for ease of illustration.

Figure 3:
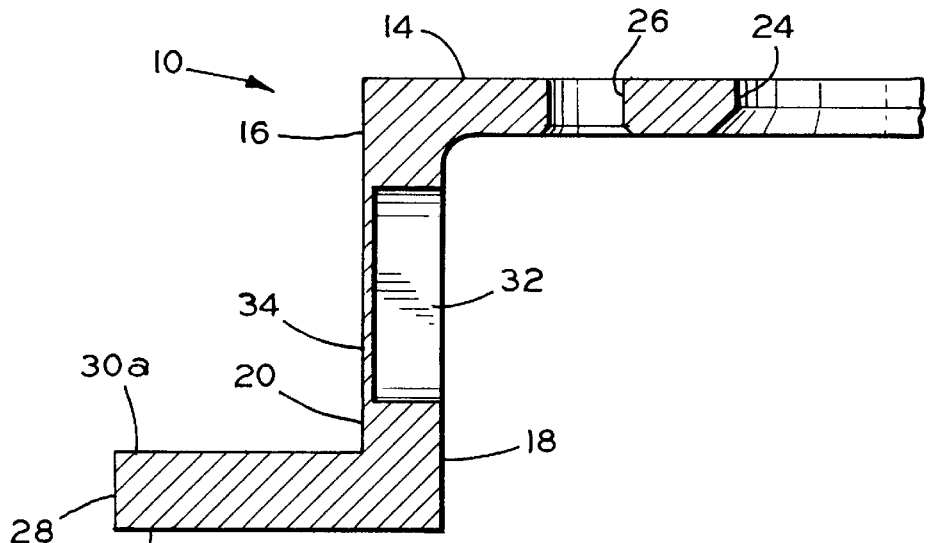
FIG. 3 is a sectional view of the rotor after a first machining step.

Next, portions of the radially outer surface of the hat wall 16 is removed, in one or more machining steps, to the point that the depressions 32 extend completely through the hat wall 16. Preferably, the initial casting shown in FIG. 2 is rough machined in the conventional manner to the desired dimensions. In such a rough machining step, portions of the radially outer hat wall surface 20 proximate the depressions 32 are removed, but a thin layer of material 34 between the depression 32 and the radially outer hat wall surface 20 may remain, as shown in FIG. 3.

Figure 4:
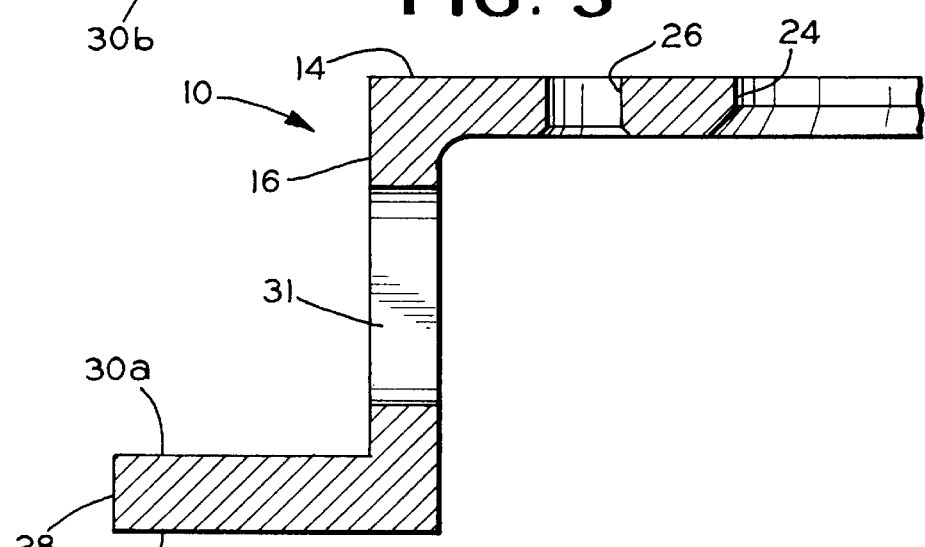
FIG. 4 is a sectional view of the rotor after a final machining step in accordance with the method of the invention.

After any rough machining step, the rotor 10 is subjected to finish machining, which removes the remaining material 34 from the radially outer hat wall surface so that the depressions 32 extend completely through the hat wall 16 to form the vents 31. The finish machining step preferably includes a finish grinding step which removes the remaining material 34, which is typically between about 5 to 10 mils thick, to complete the vents 31 as shown in FIG. 4. The finish machining step also typically includes drilling of the central pilot aperture 24 and fastener apertures 26, although these apertures may also be formed in the initial casting, as illustrated in FIG. 2.

Alternatively, the depressions 32 may be provided in the radially outer surface 20 of the hat wall 16, in a similar manner as the radially inner surface depressions 32 described above. Next, portions of the radially inner surface 18 of the hat wall 16 is removed, in one or more machining steps, to the point that the depressions 32 radially extend completely through the hat wall 16. The machining steps may include one or more rough machining steps and one or more finish machining steps. Material from the radially outer surface 20 may also be removed in addition to that removed from the radially inner surface 18. Alternatively, material may not be removed from the radially inner surface 18 in every machining step.

The invention thus provides a method of forming a rotor 10 having a vented hat section 12 which the machining steps, and the expense associated therewith, are roughly equivalent to a full-cast solid rotor.

Figure 5:
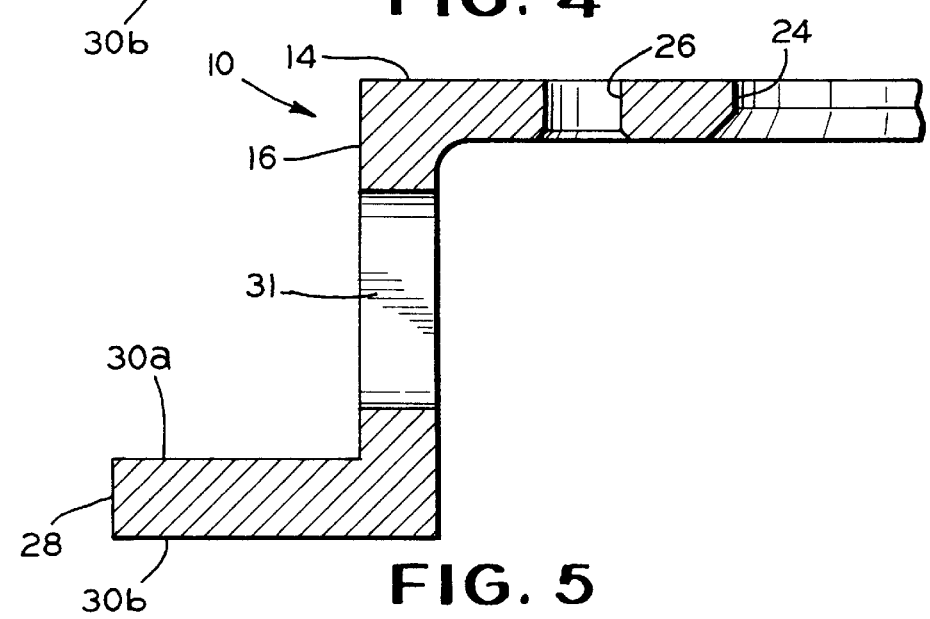
FIG. 5 is a sectional view of an alternative embodiment of a rotor formed in accordance with the invention.

Alternatively, the vents 31 may be cast through the hat wall 16 during the initial casting as shown in FIG. 5. As described above, the rotor 10 is cast using any conventional casting method from a suitable material, such as grey iron, aluminum or the like, to the desired configuration including at least the hat section 12. The initial casting is formed in such a manner that one or more vents 31 are provided in the hat wall surface 16. Each of the vents 31 is formed at a desired vent location of the final rotor 10, and is preferably formed of the desired shape. The vents 31 are formed of a depth, taken generally perpendicularly to the radially inner surface 18, which extends through the hat wall 16.

The radially outer hat wall surface 20 may then be machined to achieve the desired hat wall thickness, although the hat wall may not be machined. The machining process may include a single machining step or it may include a first, rough machining step followed by a second, finishing machining step.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A method of forming a rotor of The type including a vented hat section with a mounting face, a hat wall extending from said mounting face and a friction section extending from the hat wall, comprising the steps of:

(a) forming an initial casting including said hat section, wherein said hat section includes a hat wall having an inner surface and an outer surface and a plurality of circumferentially spaced apart depressions formed in one of said inner and outer surfaces; and (b) removing a portion of the other of said inner and outer surfaces of said hat wall in a manner such that said depressions extend completely through said hat wall, each depression thereby forming a vent.

2. The method of forming a rotor defined in claim 1 wherein step (a) includes forming the initial casting from grey iron.

3. The method of forming a rotor defined in claim 1 wherein step (a) includes forming the initial casting from aluminum.

4. The method of forming a rotor defined in claim 1 further including the step of rough machining to remove a portion of said other of said inner and outer surfaces of said hat wall in a manner such that a thin layer of said hat wall remains between said depressions and said other of said inner and outer surfaces of said hat wall.

5. The method of forming a vented rotor defined in claim 4 wherein said thin layer is between 5 and 10 mils thick.

6. The method of forming a vented rotor defined in claim 1 wherein step (a) includes forming an initial casting having a plurality of circumferentially spaced apart depressions formed in said inner surface of said hat wall.

7. The method of forming a vented rotor defined in claim 6 wherein step (b) includes removing a portion of the outer surface of said hat wall in a manner such that said depressions extend completely through said hat wall.

8. The method of forming a vented rotor defined in claim 1 wherein step (a) includes forming an initial casting having a plurality of circumferentially spaced apart depressions formed in said outer surface of said hat wall.

9. The method of forming a vented rotor defined in claim 8 wherein step (b) includes removing a portion of the inner surface of said hat wall in a manner such that said depressions extend completely through said hat wall.

10. The method of forming a vented rotor defined in claim 1 wherein said hat wall is cylindrical.

11. An initial casting for subsequently forming a vented rotor comprising:

a hat section including a central mounting face and a cylindrical hat wall extending from said mounting face having a radially inner surface and a radially outer surface, wherein a plurality of circumferentially spaced apart depressions are cast into one of said radially inner and said radially outer surfaces; and a friction section extending radially from said hat section and having a pair of oppositely directed friction surfaces.

* * * * *